H. LOUD.

Anti Friction Bushing.

No. 9,635.

Reissued April 5, 1881.

Witnesses:

W. S. Bellows

H. F. McNamar

Inventor,

H. LOUD.

Per Brown Bros.

Attys.

UNITED STATES PATENT OFFICE

HERBERT LOUD, OF EVERETT, MASSACHUSETTS.

ANTI-FRICTION BUSHING.

SPECIFICATION forming part of Reissued Letters Patent No. 9,635, dated April 5, 1881.

Original No. 224,453, dated February 10, 1880. Application for reissue filed February 18, 1881.

*To all whom it may concern:*

Be it known that I, HERBERT LOUD, of Everett, in the county of Middlesex and State of Massachusetts, have invented certain new and useful Improvements in Anti-Frictional Bushings, of which the following is a specification.

This invention relates to a box or case to be used with a series of rollers which are arranged to bear and revolve against its inner periphery, and to surround a shaft or axle on which they also bear, the whole making an anti-frictional bushing or box, as generally termed, for a shaft or axle.

In this improved box or case the bearing-surface for the rollers is composed of brass of an annular shape, which is exteriorly surrounded by and securely attached to an outer casing of cast-iron. Again, in this improved box or case the bearing-surface for the rollers is composed of brass of an annular shape, which is exteriorly surrounded by and securely attached to an outer casing of cast-iron, and interiorly, in addition to its bearing-surface for the rollers, is constructed for an interlock between it and the rollers in a direction and manner to hold and confine the rollers against escape in the direction of their length, or, in other words, against escape at either end of the box or case; and, furthermore, in this improved box or case the hereinabove-described brass bearing-surface for the rollers is in separate rings arranged edge to edge, but so as to leave a space or opening between them, and the rollers which bear on the said brass bearing-surface are carried by an annular plate of a sufficient external diameter to enter the said space or opening.

In addition to the above-stated improvements in the box or case, this invention consists of a roller, for the purpose specified, which is made in parts or sections, joined together by a common axial pin or pintle, which is shouldered intermediate of its length to hold the parts of the rollers at their ends toward each other separated from each other; and, again, it consists of an annular plate having a series of holes through it, each of which carries a frictional roller of the bushing, in combination with a frictional roller which is made in parts, secured to an axial pintle that passes through a hole in the plate, leaving the parts of the roller one at and upon each side of the plate.

In the accompanying plate of drawings my invention is illustrated.

Figure 1:
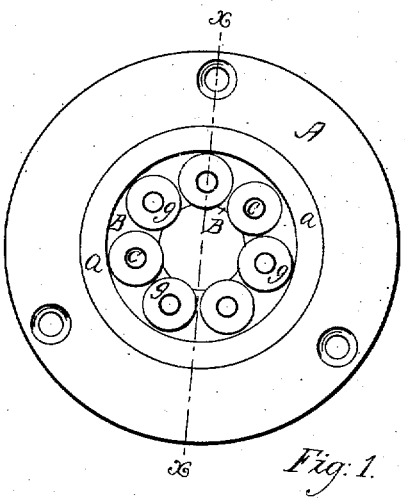
Figure 4:
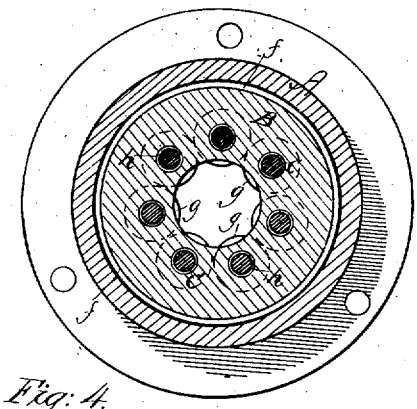
Figure 2:
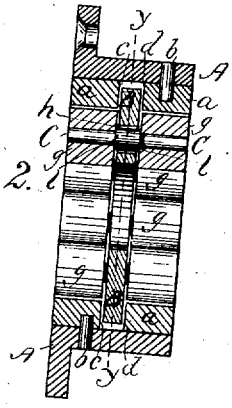
Figure 3:
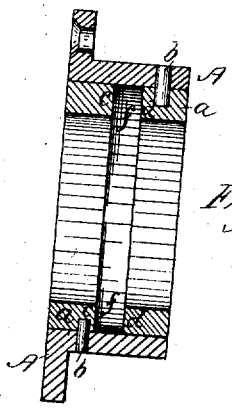
Figure 5:
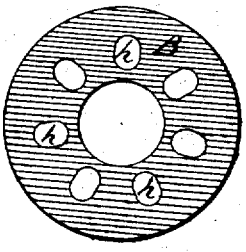
Figure 6:
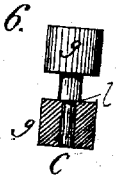

Figure 1 is an end view; Fig. 2, a central section on line *x x*, Fig. 1, from end to end of the bushing-box; and Fig. 3, a similar section with the rollers and their carrier removed; Fig. 4, a central section on line *y y*, Fig. 2, and parallel to the ends of the bushing; Figs. 5 and 6, views in detail.

In the drawings, A represents a cylindrical box or casing open at both ends. This box A is made of iron, galvanized or otherwise prepared against corrosion, and exteriorly it is adapted to be properly fitted and fastened to the article which is to be bushed—as, for instance, within the central opening of a wooden sheave to a pulley-block or of a hub to a carriage or truck wheel, &c.—and interiorly it is lined with brass *a a*, of an annular shape, and the interior surface of this brass makes and is the bearing for the frictional rollers *g* of the bushing, as will hereinafter more fully appear. This brass *a a*, as shown, is in two separate parts or pieces, each fastened within and to the inside of the iron box A by rivets or screws *b b* passing from the one into the other, or each may be obviously otherwise fastened, and in the present instance the rings are of equal width and such as to leave within the box A, between their inner edges or ends, *c d*, an annular, groove, *f*, of narrow width, but otherwise to make a complete interior lining of brass, and a bearing-surface of such metal for the frictional rollers *g g*.

B is a flat ring, entering the groove *f*, between the two parts of the lining *a a*, and projecting in a radial line therefrom toward the center of the opening of the lining-rings. This flat ring B carries the frictional rollers *g*—in the present instance seven in number. Each roller is made of brass and in two parts, which are joined together by a steel pintle, C, which passes axially through them and through a hole, *h*, in the said flat ring B. The pintle is fast in each part of the roller and loose within its hole *h* of the flat ring B, and the rollers are severally situated in relation to each other, and to the center or axis and inner periphery of the brass lining, and the diameter of the rollers *g* is such as to secure an arrangement of said rollers about and within the brass lining and their bearing, both on the shaft or axle, in connection with which the bushing is to be used, and on the inner periphery of the brass lining and without contact between the shaft and the inner periphery of the ring-carrier B for the rollers *g*.

The parts of each roller are, as is obvious, the one upon one side and the other upon the other side of their carrying plate or ring B, and the pintle C which connects them is first driven into the one part and riveted and then into the other and similarly riveted; and in order to secure the proper space between their ends toward each other, and prevent any bind by such ends on the flat faces of their carrying-plate, the pintle has shoulders *l*, (shown in Figs. 2 and 6,) to limit the approach of the parts of the roller toward each other on the pintle when driven and riveted or otherwise fastened thereto. These shoulders *l* are made by having the pintle the largest in diameter at its central portion.

The separate parts above mentioned, and their arrangement together, as described, make an anti-frictional bushing of my improved construction, and in the production thereof the ring-carrier for the rollers is provided with its rollers, as stated, and then having fastened one part of the brass lining *a a* in place in the box A, the carrying-plate with the rollers is inserted, and then the other part of the brass lining is inserted and secured, which completes the bushing.

Among many advantages of the present improved construction may be mentioned that the carrying ring-plate for the rollers is, as it were, a solid plate or ring, and thus sufficiently strong to sustain all the strain which comes upon it; that the rollers, by being made in parts joined together by a pintle, in the manner described, possess the greatest amount of strength, and enable, as it were, a solid plate or ring to be used, as has been described; that the rollers can be flush with the ends of the bushing-box, and thus the better sustain the strain, and, again, be less susceptible of twisting, and will run the steadier; that the combination of iron, galvanized or otherwise protected against rust, and of a brass lining thereto, obviously, while reducing the expense of manufacture, secures and possesses all the advantages of a box made wholly of brass, brass being the most desirable metal to use in all parts of the bushing, especially bushings to be used in pulley-sheaves, &c., and it is the least affected by exposure to moisture, salt water, &c., and secures the best running-surfaces.

It is preferable to make the rollers of brass, and I intend to so make them; and again, the pintles joining their parts I prefer to make of steel, although they may be made of brass, &c.

The groove *f* between the two ends of the box A, in combination with the plate having the rollers, obviously secures the rollers in their place between the two ends of the bushing and holds them against movement lengthwise; and in this regard instead of having holes in the plate-ring B to receive the rollers, the ring may be notched or recessed at its outer edge therefor.

The holes *h* in the carrying-plate for the roller-pintles C it is preferable to have elongated in a direction radial with the center of the bushing, as shown in detail in Fig. 5, which is a view of the roller-carrying plate of itself. Elongated holes allow of a freer play and movement to the rollers when in operation, as is obvious.

The brass lining, instead of being made in parts riveted or otherwise fastened in the case, as above described, may be cast with the case, proper cores for the production of the groove *f* being used in casting; and, again, the case may be made in sections, bolted or otherwise secured together, and the case, together with the brass lining, may be adapted for the lining to be screwed in the case.

In addition to the results and advantages which have already been particularly specified as being secured by the present invention, it is plain to be seen that practically the main and principal portions of the same are traceable to these features of the box or case: First, that it has a brass lining, which makes the inner periphery thereof and the surface against which the frictional rollers bear, while bearing at the same time upon their shaft or axles; second, that it has a brass lining, which makes the inner periphery thereof and the surface against which the frictional rollers bear, while bearing at the same time upon their shaft or axle, and, further, makes and constitutes a means, through an interlock of them with it, by which to hold the rollers from an escape endwise from the box or case.

Having thus described my invention, what I claim, and desire to secure by Letters Patent, is—

1. In an anti-frictional bushing or box for shafts and axles composed of rollers arranged for a bearing around and upon the shaft or axle and against the inner periphery of the box or case, a box or case therefor which has its bearing-surface for the frictional rollers made of brass, of an annular or ring shape, which is attached to and surrounded by an outer casing or box of iron.

2. In an anti-frictional bushing or box for shafts and axles composed of rollers arranged for a bearing around and upon the shaft or axle and against the inner periphery of the box or case, a box or case therefor which has its bearing-surface for the frictional rollers made of brass, which is attached to and surrounded by an outer casing or box of iron, and is constructed interiorly for an interlock between it and the rollers in a direction and manner to hold and confine the rollers against escape in the direction of their length, or, in other words, against escape at either end of the box or case.

3. The box or casing A, made of iron, suitably protected against rust and lined with brass rings *a a*, having a groove, *f*, between them within the box, substantially as and for the purpose described.

4. A box or casing, A, made of iron, in combination with brass lining-rings *a a*, having a groove, *f*, between them, and with a ring or plate, B, which carries a series of frictional rollers, *g*, and is arranged within said groove *f*, all substantially as described, for the purpose specified.

5. The combination, with the box or case A, of two rings, *a a*, arranged within and lining the case, and separated from each other to create an annular groove, *f*, and a ring or plate, B, arranged to rotate within the said groove, and provided with a series of holes within which are arranged the connecting-journals of friction-rollers, substantially as described.

6. A roller made in parts, in combination with an axial pintle, C, having shoulders *l*, substantially as and for the purpose described.

7. A ring, B, having holes *h*, in combination with rollers *g*, made in parts and attached thereto, substantially as and for the purpose described.

HERBERT LOUD.

Witnesses:
EDWIN W. BROWN,
WM. S. BELLOWS.